INVENTOR.
Robert E. Ohaus,

Jan. 3, 1956  R. E. OHAUS  2,729,439
CHECK ROD MOUNTING FOR A WEIGHING SCALE
Filed Feb. 24, 1955  2 Sheets-Sheet 2
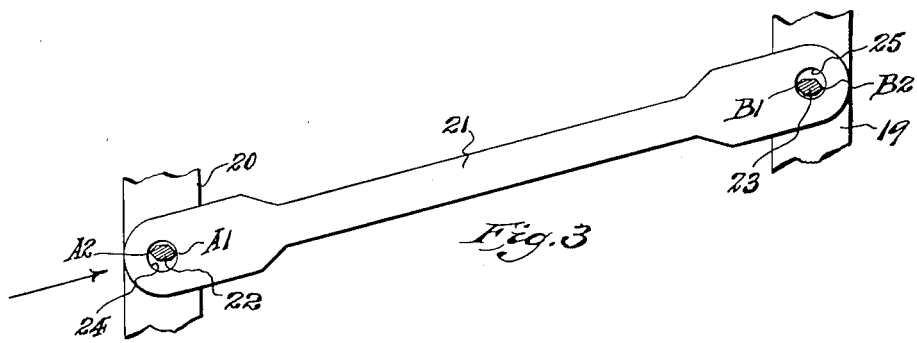
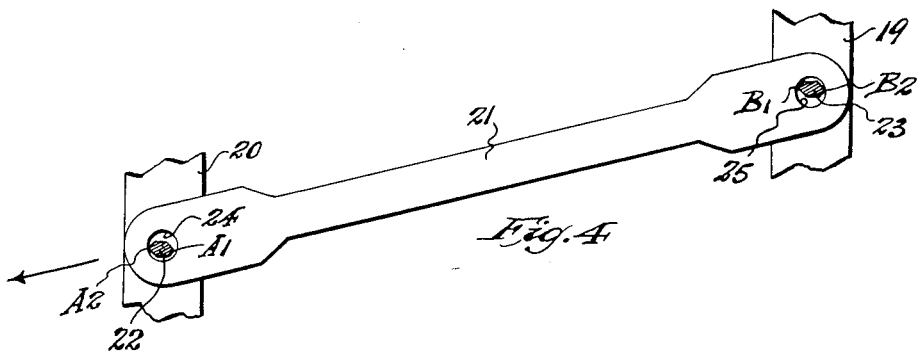
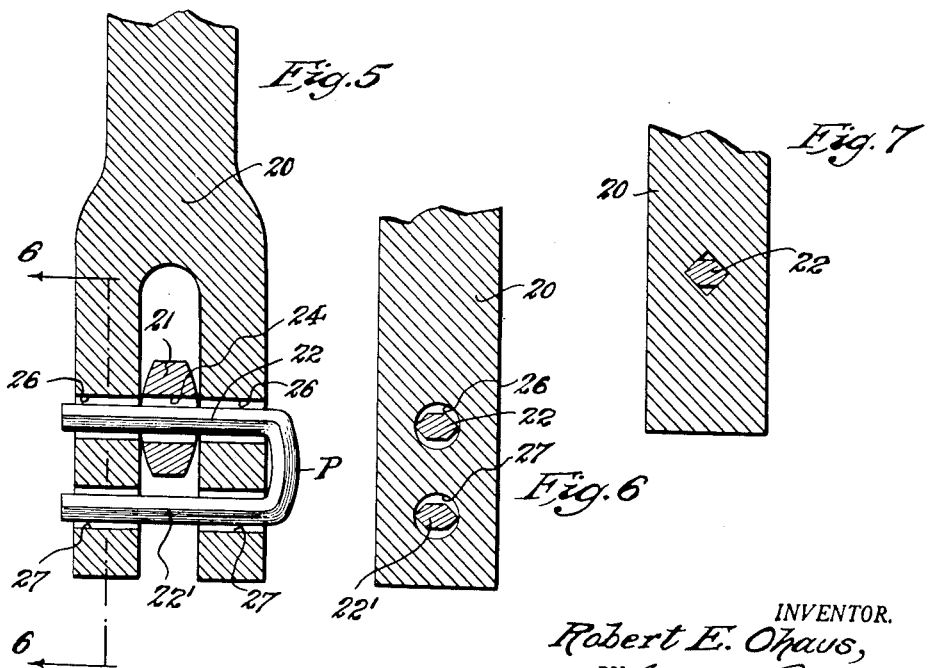
INVENTOR.
Robert E. Ohaus,
BY George D. Richards
Attorney United States Patent Office 2,729,439
Patented Jan. 3, 1956

2,729,439

CHECK ROD MOUNTING FOR A WEIGHING SCALE

Robert E. Ohaus, Westfield, N. J., assignor to Ohaus Scale Corporation, Union, N. J., a corporation of New Jersey Application February 24, 1955, Serial No. 490,191

6 Claims. (Cl. 265—54)

This invention relates to weighing scales of the counter type wherein the load receiving means is pivotally supported in connection with one arm of the pivoted scale beam; and this invention has reference, more particularly, to improve means for connecting a check rod to and for extension between the scale beam bearing post and the parallel support of the load receiving means, whereby to stabilize the operative perpendicular position of said load receiving means.

In general, in the manufacture of counter type weighing scales, it has heretofore been the practice to connect a check rod to and for extension between a dependent portion of the scale beam fulcrum post and a dependent portion of the support of the scale load receiving platform or pan, whereby to provide a parallelogram linkage of these parts, and it has been customary to pivotally connect the respective ends of the check rod to the respective dependent portions by means of round pivot pins fixed across said respective portions. Such means for pivotally mounting the check rod is not altogether satisfactory, since, under tilting action exerted by a load deposited upon the scale platform or pan to the left or right of its center, considerable frictional drag is exercised by the pivot pins against the openings in the check rod ends through which they pass. Such frictional drag impairs the sensitivity of the weighing scale.

Having the above in view, it is an object of this invention to provide novel means for pivotally connecting a check rod, in parallelogram linkage of a weighing scale, between the scale beam fulcrum post and the scale platform or pan supporting means in such manner as to provide knife edge bearing elements, of very simple and inexpensive construction, at the pivot points.

The invention has for a further object to provide check rod pivoting means comprising pivot pins of square cross section, so fixed in respective dependent portions of a scale beam fulcrum post and of the scale platform or pan supporting means, that diagonals thereof are disposed horizontally or perpendicular to the axes of said portions, whereby to provide inner and outer knife edge bearing elements, which are respectively engageable with inner and outer sides of circular openings in respective ends of the check rod through which said pivot pins extend, accordingly as the scale platform or pan support is tilted in one or the opposite direction by a load deposited on the platform or support in offset relation to the center thereof, thereby to subject, in the one case, the check rod to push or compressional force, or, in the other case, to pull or tensional force, so that frictional drag, incident to pivotal movements of the check rod in both cases, is eliminated, and the sensitivity of the weighing scale is thereby enhanced.

The above and other objects will be understood from the following detailed description of this invention as read in connection with the accompanying drawings, in which:

Fig. 3 is a similar view showing the check rod, when in operation, subjected to push or compressional force; and Fig. 4 is also a similar view showing the check rod, when in operation, subjected to pull or tensional force.

Fig. 5 is a fragmentary vertical longitudinal sectional view, taken on line 5—5 in Fig. 1, but drawn on a considerably enlarged scale; Fig. 6 is a longitudinal sectional view, taken on line 6—6 in Fig. 5, and Fig. 7 is a longitudinal sectional view similar to that of Fig. 6, but showing a modified form of check rod pivoting pin and manner of supporting the same.

Figure 1:
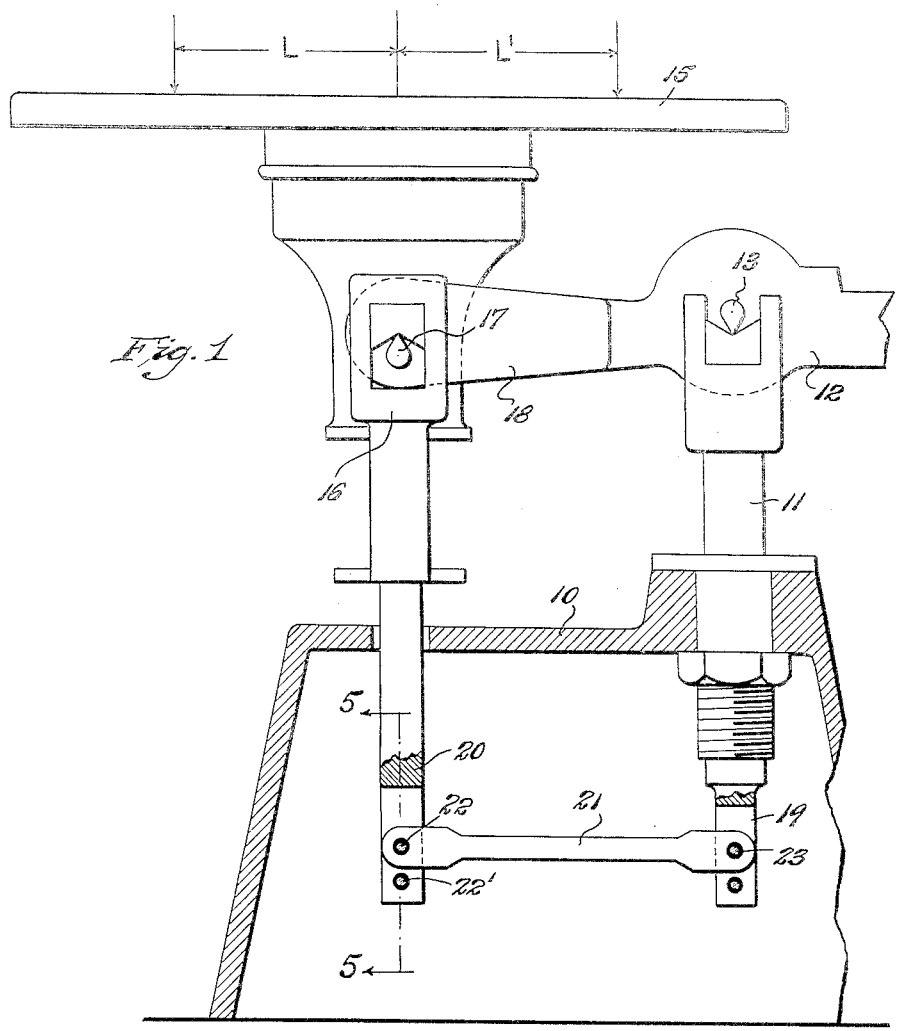
Fig. 1 is a fragmentary elevational view, in part section, of a counter type weighing scale provided with the check rod pivoting means of this invention.

Referring to the drawings, wherein like characters of reference denote corresponding parts, the reference character 10 indicates the base of a weighing scale to which is suitably affixed an upstanding fulcrum post 11 by which the scale beam 12 is pivotally supported by the knife edge pivot members 13. A load receiving platform or pan 15 is pivotally supported by its bearing yoke 16 on knife edge pivot members 17 of the bifurcate rear arm 18 of the scale beam 12. Axially dependent from the fulcrum post 11 is a bifurcate portion 19. Axially dependent from the bearing yoke 16, by which the scale platform or pan 15 is carried, is a bifurcate portion 20. A check rod 21 is pivotally interconnected between the bifurcate free ends of said dependent portions 19 and 20. The fulcrum post and its dependent portion, the rear arm of the scale beam, the platform or pan bearing yoke and its dependent portion and the check rod form a parallelogram linkage operative to maintain the platform or pan and its supporting means perpendicular or normal under oscillatory movements of the scale beam.

Mounted through the dependent portion 20 of the platform or pan bearing yoke 16, to bridge the fork thereof, is a square type check rod pivot pin 22, the same being so fixed relative thereto that a diagonal thereof is horizontally disposed, i. e., in a plane perpendicular to the axis of said dependent portion 20. As so disposed the pin 22 provides an inner knife edge pivot A1 and an oppositely projecting outer knife edge pivot A2.

Similarly, mounted through the dependent portion 19 of the fulcrum post 11, to bridge the fork thereof, is a like square type check rod pivot pin 23, the same being so fixed relative thereto that a diagonal thereof is horizontally disposed, i. e., in plane perpendicular to the axis of said dependent portion 19. As so disposed, the pin 23 provides an inner knife edge pivot B1 and an oppositely projecting outer knife edge pivot B2.

The inner and outer ends of the check rod 21 are provided with respective openings 24 and 25, each of a diameter a little in excess of the length of the knife edge pivot forming diagonals of the pins 22 and 23. The opposite ends of the check rod are respectively entered in the respective forks of the dependent portions 20 and 19, so that the pins 22 and 23 respectively engage through said openings 24 and 25 for impingement against selected sides thereof accordingly as the check rod is subjected to compressional pushing force or to tensional pulling force, thus pivotally interconnecting the check rod with said dependent portions 20 and 19.

Figure 2:
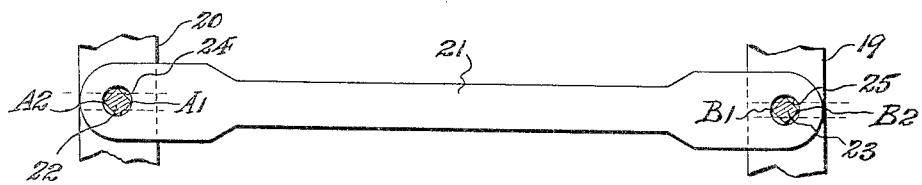
Fig. 2 is an enlarged fragmentary view, in part section, of the check rod and pivoting means therefor.

For purposes hereinafter more particularly explained, the corner extremities of the vertical diagonals of the check rod pivot pins, at least where said pins engage the check rod ends, are preferably ground off or truncated in the planes of the broken lines shown in Fig. 2, thus flattening the top and bottom surfaces of said pins, and thereby reducing their vertical cross-sectional dimensions.

The square type check rod pivoting pins, in the operation of the weighing scale, function as follows:

Consider first, that a load is deposited upon the scale platform or pan offset some distance L (see Fig. 1) outwardly from the center thereof. Under such disposition of the load, the platform or pan and its support will tilt about the pivot members 17 in counterclockwise direction, thus swinging the dependent portion 20 of the bearing yoke 16 inwardly. Under these conditions, a push or endwise compressional force is exercised upon the check rod 21. This force causes the inner knife edge pivot A1 of the pin 22 to impinge centrally against the inner side of the circular opening 24 of the outer end of the check rod, thus pivoting this end thereof for substantially frictionless turning movement about said knife edge pivot A1. At the same time, the check rod is pushed longitudinally toward the dependent portion 19 of the scale beam fulcrum post 11, thereby causing the inner knife edge pivot B1 of the pin 23 to impinge centrally against the inner side of the circular opening 25 of the inner end of the check rod, thus pivoting this end thereof for substantially frictionless turning movement about said knife edge pivot B1 (see Fig. 3). It will now be obvious, assuming a suitable counterbalance is manipulated to bring the scale beam to equilibrium, that during the consequent oscillation of the parallelogram linkage, the relative turning movements of the parts of the latter are fulcrumed at all points by substantially frictionless knife edge pivots, with the result that sensitivity of the weighing scale is greatly enhanced.

Consider now, that a load is deposited upon the scale platform or pan offset some distance L' (see Fig. 1) inwardly from the center thereof. Under such disposition of the load, the platform or pan and its support will tilt about the pivot members 17 in clockwise direction, thus swinging the dependent portion 20 of the bearing yoke 16 outwardly. Under these conditions, a pull or tensional force is exercised upon the check rod 21, which causes the outer knife edge pivot A2 of the pin 22 to impinge centrally against the outer side of the circular opening 24 of the outer end of the check rod, thus pivoting this end thereof for substantially frictionless turning movement about said knife edge pivot A2. At the same time, the check rod is pulled longitudinally relative to the dependent portion 19 of the scale beam fulcrum post 11, thereby causing the outer knife edge pivot B2 of the pin 23 to impinge centrally against the outer side of the circular opening 25 of the inner end of the check rod, thus pivoting this end thereof for substantially frictionless turning movement about said knife edge pivot B2 (see Fig. 4). It will also be understood that when, under these conditions, a suitable counterbalance is manipulated to bring the scale beam to equilibrium, during consequent oscillation of the parallelogram linkage, the relative turning movements of the parts of the latter are likewise fulcrumed at all points by substantially frictionless knife edge pivots, and therefore the sensitivity of the weighing scale is likewise enhanced under these conditions.

In the above described operations there is no sliding action of the engaged portions of the openings 24 and 25 of the check rod relative to the engaging knife edge pivots of the pins 22 and 23, the rotative movements being pivotal only.

Under conditions of push or compressional force applied to the check rod 21, the turning radius of the latter is the distance A1 to B1 (Fig. 3), but under conditions of pull or tensional force, the turning radius of the check rod 21 is the distance A2 to B2 (Fig. 4). These lengths vary by the sum of the diameters of the check rod end openings 24 and 25. If, however, the cross-sectional size of the check pins 22 and 23 is kept to a minimum, then small check rod end openings can be used, and consequently the lengths A1 to B1 and A2 to B2 so closely approach equality that sensitive and satisfactory operation of the weighing scale is assured.

Since symmetrical square cross-sectional shapes of check rod pivot pins would include vertically aligned projecting corners, the latter would so quickly abut the margins of the check pin end openings that amplitude of turning movement of the check rod would be unduly limited, especially when employing openings of desirably small diameter. To avoid this, it is desirable to truncate said vertical corners, as already above described, thus so reducing the vertical dimensions of the check rod pivot pins as to permit a substantial degree of free movement thereof within the check rod end openings, thus allowing maximum amplitude of turning movement of the check rod during weighing scale operations.

The proper orientation of the axes of the knife edge pivots A1 and A2 of pin 22, and the knife edge pivots B1 and B2 of pin 23, in horizontal planes, or perpendicular to the axes of the portions by which said pins are carried, is very important, in order to assure equality of length A1 to pivot 17 and A2 to pivot 17 as to pin 22, and equality of length B1 to pivot 13 and B2 to pivot 13 as to pin 23. Although as shown in Fig. 7, a single pivot pin (e. g., pin 22) can be used, great care and precision is necessary to so mount and secure the same in the supporting part (e. g., dependent portion 20), that the desired horizontal orientation is attained and maintained.

To quickly and easily achieve proper orientation of a check rod pivot pin in its supporting part, it is desirable to provide pivot pins of U-shape, as shown more particularly in Figs. 5 and 6 of the drawings. Taking the pivot pin 22 as an example of this, the same comprises a U-shaped body P, the upper leg of which forms the pivot pin 22 and the lower leg 22' provides a positioning means. The bifurcate dependent portion 20 of the bearing yoke 16 is provided with an upper circular opening 26 and a lower circular opening 27 spaced apart to receive the respective legs 22 and 22' of pin body P. Said openings 26 and 27 correspond in diameter to the horizontal cross-sectional diameter of the pin body legs 22 and 22'. When said legs 22 and 22' are engaged in and through said openings 26 and 27, the upper pivot forming leg 22 will be properly oriented in the opening 26, and will be retained so oriented by the engagement of the positioning leg 22' in the opening 27, since rotative displacement of the pin body, and especially the pivot forming leg 22 thereof, is prevented. The check rod pivot pin 23 is preferably of like formation and mounting. The lower leg 22' of the U-shaped pin body P also provides means adapted to serve for suspension of a specimen from the underside of the scale beam load bearing arm, when use of the scale for specific gravity tests is desired.

Having now described my invention, I claim:

1. In a weighing scale parallelogram check linkage, a check rod, means to pivotally connect an end of the check rod to a given member of the check linkage, said means comprising a U-shaped element, the legs of which are disposed in vertical plane and fixed across said member, one leg of said element being adapted to serve as a pivot pin portion and being of polygonal cross-section with its major diagonal disposed perpendicular to the axis of said member thereby to provide an inner knife edge pivot and an outer knife edge pivot, said end of the check rod having a circular opening through which said pivot pin portion extends, and said opening being of a diameter slightly in excess of the length of the knife edge pivot forming diagonal of said pivot pin portion.

2. In a weighing scale parallelogram check linkage, a check rod, means to pivotally connect an end of the check rod to a given member of the check linkage, said means comprising a U-shaped element, the legs of which are disposed in vertical plane and fixed across said member, the upper leg of said element being adapted to serve as a pivot pin portion and being of square cross-section with a horizontal diagonal thereof disposed perpendicular to the axis of said member thereby to provide an inner knife edge pivot and an outer knife edge pivot, said end of the check rod having a circular opening through which said pivot pin portion extends, said opening being of a diameter slightly in excess of the length of the knife edge pivot forming diagonal of said pivot pin portion, and the extremities of the vertical diagonal of said pivot pin portion being truncated whereby to reduce the vertical dimensions of the latter.

3. In a weighing scale having a scale beam, a pivotal support for the scale beam, a scale pan, and a support for the scale pan pivotally mounted on an arm of the scale beam; in combination therewith a check rod, means to pivotally connect opposite ends of said check rod respectively to the scale beam support and to the scale pan support, each said means comprising a pivot pin of cross-sectional shape having a major diagonal and a minor diagonal, said pivot pin being fixed across a given support so as to dispose its minor diagonal in alignment with the vertical axis of said support and its major diagonal perpendicular to the axis of said support, said pivot pin having oppositely projecting knife edge pivots extending in the plane of and terminating its major diagonal comprising an inner knife edge pivot and an outer knife edge pivot, and the cooperative end of the check rod having a circular opening through which the pivot pin extends, said opening being of a diameter slightly in excess of the length of the knife edge pivot provided major diagonal of the pivot pin, whereby said inner and outer knife edge pivots can selectively impinge the margin of said opening in pivoting contact therewith accordingly as the check rod is subjected to compressional pushing force or to tensional pulling force.

4. In a weighing scale having a scale beam, a pivotal support for the scale beam, a scale pan, and a support for the scale pan pivotally mounted on an arm of the scale beam; in combination therewith a check rod means to pivotally connect opposite ends of said check rod respectively to the scale beam support and to the scale pan support, each said means comprising a pivot pin of square cross-section fixed across a given support so as to dispose the horizontal diagonal thereof perpendicular to the axis of said support and the vertical diagonal thereof parallel to the axis of said support, extremities of said horizontal diagonal providing knife edge pivots comprising an inner knife edge pivot and an outer knife edge pivot, the cooperative end of the check rod having a circular bearing opening through which the pivot pin extends, said bearing opening being of a diameter slightly in excess of the length of the horizontal diagonal of the pivot pin, whereby said inner and outer knife edge pivots can selectively impinge the margin of said bearing opening in pivoting contact therewith accordingly as the check rod is subjected to compressional pushing force or to tensional pulling force, and the extremities of the vertical diagonal of the pivot pin being truncated whereby to reduce said vertical diagonal to a dimension substantially less than that of the diameter of the bearing opening.

5. In a weighing scale parallelogram check linkage including a check rod, means to pivotally connect respective ends of the check rod to respective other members of the check linkage, each said means comprising a pivot pin of cross-sectional shape having a major diagonal and a minor diagonal, said pivot pin being fixed across a given other member so as to dispose its major diagonal perpendicular to the vertical axis of said member and its minor diagonal in alignment with the vertical axis of said member, extremities of the major diagonal of the pivot pin being formed to provide knife edge pivots comprising an inner knife edge pivot and an outer knife edge pivot, the cooperative end of the check rod having a circular bearing opening through which the pivot pin extends, and said bearing opening being of a diameter slightly in excess of the knife edge pivot provided major diagonal of the pivot pin, whereby said inner and outer knife edge pivots can selectively impinge the margin of said bearing opening in pivoting contact therewith accordingly as the check rod is subjected to compressional pushing force or to tensional pulling force.

6. In a weighing scale parallelogram check linkage including a check rod, means to pivotally connect respective ends of the check rod to respective other members of the check linkage, each said means comprising a pivot pin of square cross-section fixed across a given other member so as to dispose the horizontal diagonal thereof perpendicular to the axis of said member and the vertical diagonal parallel to the axis of said member, extremities of the horizontal diagonal of the pivot pin providing knife edge pivots comprising an inner knife edge pivot and an outer knife edge pivot, the cooperative end of the check rod having a circular bearing opening through which the pivot pin extends, said bearing opening being of a diameter slightly in excess of the length of the horizontal diagonal of the pivot pin, whereby said inner and outer knife edge pivots can selectively impinge the margin of said bearing opening in pivoting contact therewith accordingly as the check rod is subjected to compressional pushing force or to tensional pulling force, and the extremities of the vertical diagonal of the pivot pin being truncated whereby to reduce said vertical diagonal to a dimension substantially less than that of the diameter of the bearing opening.

References Cited in the file of this patent

UNITED STATES PATENTS

| Number | Name | Date |
|---|---|---|
| 1,351,449 | Stevens | Aug. 31, 1920 |
| 1,671,286 | Hapgood | May 29, 1928 |
| 1,859,604 | Sachse | May 24, 1932 |
| 1,899,436 | Fletcher | Feb. 28, 1933 |
| 1,954,205 | Hem | Apr. 10, 1934 |
| 2,144,845 | Kniesche | Jan. 24, 1939 |
| 2,310,493 | Richard | Feb. 9, 1943 |